(12) United States Patent
Kim (10) Patent No.: US 11,500,707 B2
(45) Date of Patent: Nov. 15, 2022

(54) CONTROLLER, MEMORY CONTROLLER, STORAGE DEVICE, AND METHOD OF OPERATING THE CONTROLLER

(71) Applicant: SK hynix Inc., Gyeonggi-do (KR)

(72) Inventor: Seung Hun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 656 days.

(21) Appl. No.: 16/504,418

(22) Filed: Jul. 8, 2019

(65) Prior Publication Data
US 2020/0174865 A1   Jun. 4, 2020

(30) Foreign Application Priority Data

Nov. 30, 2018  (KR) .................... 10-2018-0152881

(51) Int. Cl.
*G06F 11/07*   (2006.01)
*G06F 13/16*   (2006.01)
*G06F 3/06*    (2006.01)

(52) U.S. Cl.
CPC .......... *G06F 11/073* (2013.01); *G06F 3/0619* (2013.01); *G06F 3/0626* (2013.01); *G06F 3/0658* (2013.01); *G06F 3/0679* (2013.01); *G06F 11/0793* (2013.01); *G06F 13/1668* (2013.01)

(58) Field of Classification Search
CPC .... G06F 11/073; G06F 11/07; G06F 11/0787; G06F 11/0793; G06F 3/0619; G06F 11/0775
See application file for complete search history.

(56) References Cited

U.S. PATENT DOCUMENTS

2019/0370480 A1* 12/2019 Ahmed ............... G06F 21/6218

FOREIGN PATENT DOCUMENTS

| KR | 10-2004-0018624 | 3/2004 |
| KR | 10-2010-0068905 | 6/2010 |

* cited by examiner

*Primary Examiner* — Nadeem Iqbal
(74) *Attorney, Agent, or Firm* — IP & T Group LLP (57) ABSTRACT

A controller for use in a memory device includes an error information generator configured to receive error information about an error occurring while a command is being processed at a protocol layer, generate command error information corresponding to the command based on the received error information, and store the generated command error information in a first storage area, and an error information manager configured to store the command error information, stored in the first storage area, in a second storage area in response to an external request.

20 Claims, 9 Drawing Sheets

CONTROLLER, MEMORY CONTROLLER, STORAGE DEVICE, AND METHOD OF OPERATING THE CONTROLLER

CROSS-REFERENCE TO RELATED APPLICATION

The present application claims priority under 35 U.S.C. § 119(a) to Korean patent application number 10-2018-0152881, filed on Nov. 30, 2018, which is incorporated herein by reference in its entirety.

BACKGROUND

Field of Invention

Various embodiments of the present disclosure generally relate to a controller, a memory controlling having the controller, and a storage device having the memory controller, and more particularly, to a controller that manages an error occurring in a protocol layer, a memory controller having the controller, and a storage device having the memory controller.

Description of Related Art

A storage system may include a host and a storage device. The storage device may store data or output stored data under the control of the host. The storage device may include, for example, a nonvolatile memory. The storage device may be coupled to the host through any of various standard interfaces such as Universal Flash Storage (UFS), Serial ATA (SATA), Small Computer System Interface (SCSI), Serial Attached SCSI (SAS), and embedded MMC (eMMC).

SUMMARY

Various embodiments of the present disclosure are directed to a controller that manages an error occurring in a protocol layer, a memory controller having the controller, and a storage device having the memory controller.

An embodiment of the present disclosure may provide for a controller. The controller may include an error information generator configured to receive error information about an error occurring while a command is being processed at a protocol layer, generate command error information corresponding to the command based on the received error information, and store the generated command error information in a first storage area, and an error information manager configured to store the command error information, stored in the first storage area, in a second storage area in response to an external request.

An embodiment of the present disclosure may provide for a memory controller. The memory controller may include a device interface configured to process a command received from a host and record error information about an error occurring while the command is being processed, an error information generator configured to receive the error information from the device interface, generate command error information corresponding to the command based on the received error information, and store the generated command error information in a first storage area, and an error information manager configured to store the command error information, stored in the first storage area, in a second storage area in response to an external request.

An embodiment of the present disclosure may provide for a storage device. The storage device may include a memory controller including a first storage area, and a memory device including a second storage area, wherein the memory controller is configured to, when an error occurs while a command is being processed at a protocol layer, generate command error information corresponding to the command, store the generated command error information in the first storage area, and store, when a set event occurs, the command error information, stored in the first storage area, in the second storage area.

An embodiment of the present disclosure may provide for an operating method for a controller which controls a memory device in response to a Universal Flash Storage (UFS) command provided from a host communicating with the controller through a UFS protocol layer having plural layers. The operating method may include detecting an error among the plural layers while executing the UFS command, identifying a layer, in which the error occurs among the plural layers, and controlling, when the controller becomes fully inactive, the memory device to store therein UFS information about the UFS command, the identified layer, and the error together with Small Computer System Interface (SCSI) information about one or more recent SCSI commands executed before the UFS command, wherein the stored UFS information and SCSI information are provided for analyzing the error.

DETAILED DESCRIPTION

Advantages and features of the present disclosure, and methods for achieving the same will be described with reference to embodiments described later in the specification together with the accompanying drawings. The present disclosure is not limited to the following embodiments but may be embodied in other forms. Rather, these embodiments are provided so that the present disclosure will be thorough and complete, and will fully convey the technical spirit of the disclosure to those skilled in the art.

It is noted that in this specification, "connected/coupled" refers to one component not only directly coupling another component but also indirectly coupling another component through an intermediate component. In the specification, when an element is referred to as "comprising" or "including" a component, it does not preclude another component but may further include other components unless the context clearly indicates otherwise. In the specification, "at least one of A or B" should be understood to mean "only A," "only B," or "both A and B."

Hereinafter, embodiments of the present disclosure will be described with reference to the attached drawings.

Figure 1:
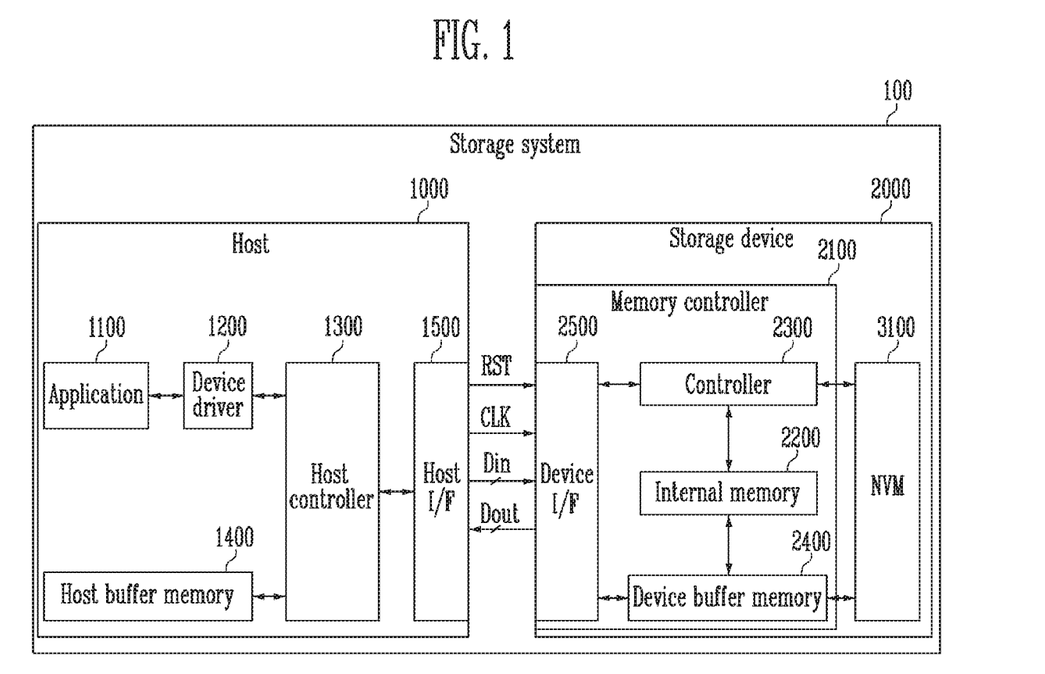
FIG. 1 is an example diagram illustrating a storage system.

FIG. 1 is an example diagram illustrating a storage system.

Referring to FIG. 1, a storage system 100 may include a host 1000 and a storage device 2000.

The host 1000 may perform various operations required in order to operate the storage system 100. For example, the host 1000 may run an operating system (OS) used in the storage system 100 and execute various application programs on the OS. The host 1000 may write data to the storage device 2000 or may read data written to the storage device 2000.

The host 1000 may include an application 1100, a device driver 1200, a host controller 1300, a host buffer memory 1400, and a host interface (Host I/F) 1500.

The application 1100 may be an operating system or an application program which is executed on the host 1000, or firmware or software which manages the application program executed on the host 1000. The application 1100 may transmit input/output requests for the transmission of data to the storage device 2000 or the reception of data from the storage device 2000 to the device driver 1200. The input/output requests may be, but are not limited to, at least one of a read request, a write request, or an erase request.

The device driver 1200 may convert the input/output requests generated by the application 1100 into requests defined in a protocol specification, and may transmit the converted requests to the host controller 1300. The device driver 1200 may be implemented through firmware or software.

The host controller 1300 may control the overall operation in the host 1000. For example, when a write request is received from the device driver 1200, the host controller 1300 may provide data stored in the host buffer memory 1400 to the storage device 2000 through the host interface 1500. For example, when a read request is received from the device driver 1200, the host controller 1300 may receive data from the storage device 2000 through the host interface 1500.

The host buffer memory 1400 may be used as a main memory or a cache memory for the host 1000. The host buffer memory 1400 may temporarily store data to be provided to the storage device 2000. The host buffer memory 1400 may also be used as a driving memory for executing the application 1100 or the device driver 1200.

The host interface 1500 may be coupled to a device interface (Device I/F) 2500 through data lines Din and Dout used to transmit/receive data, a reset line RST used to transmit a hardware reset signal, a clock line CLK used to transmit a reference clock signal, etc. The data lines Din and Dout may be implemented as a plurality of pairs, wherein a pair of one data input line Din and one data output line Dout may be referred to as a "lane". The host interface 1500 may communicate with the device interface 2500 using at least one of interface protocols such as Peripheral Component Interconnect-Express (PCI-e or PCIe), Advanced Technology Attachment (ATA), Serial ATA (SATA), Parallel ATA (DATA), Universal Serial Bus (USB), Multi-Media Card (MMC), Enhanced Small Disk Interface (ESDI), Integrated Drive Electronics (IDE), Mobile Industry Processor Interface (MIPI), Universal Flash Storage (UFS), Small Computer System Interface (SCSI), or Serial Attached SCSI (SAS), but embodiments of the present disclosure are not limited thereto.

The storage device 2000 may write data or provide written data to the host 1000 under the control of the host 1000. The storage device 2000 may be implemented as a Solid State Drive (SSD), a Multi Media Card (MMC), an embedded MMC (eMMC), a Secure Digital (SD) card or a Universal Flash Storage (UFS), but embodiments of the present disclosure are not limited thereto.

The storage device 2000 may include a memory controller 2100 and a nonvolatile memory (NVM) 3100.

The memory controller 2100 may control the overall operation of the storage device 2000.

The memory controller 2100 may include an internal memory 2200, a controller 2300, a device buffer memory 2400, and the device interface (Device I/F) 2500.

The internal memory 2200 may store various types of information generated while the memory controller 2100 or the controller 2300 is operating.

The controller 2300 may control a write operation, a read operation or an erase operation of the nonvolatile memory 3100. The controller 2300 may exchange data with the nonvolatile memory 3100 or the device buffer memory 2400 through an address bus or a data bus.

The device buffer memory 2400 may temporarily store data to be stored in the nonvolatile memory 3100 or data read from the nonvolatile memory 3100. The device buffer memory 2400 may be implemented as a volatile memory or a nonvolatile memory.

The device interface 2500 may communicate with the host interface 1500 using at least one of interface protocols such as Peripheral Component Interconnect-Express (PCIe), Advanced Technology Attachment (ATA), Serial ATA (SATA), Parallel ATA (PATA), Universal Serial Bus (USB), Multi-Media Card (MMC), Enhanced Small Disk Interface (ESDI), Integrated Drive Electronics (IDE), Mobile Industry Processor Interface (MIPI), Universal Flash Storage (UFS), Small Computer System Interface (SCSI), or Serial Attached SCSI (SAS), but the embodiments of the present disclosure are not limited thereto.

The nonvolatile memory 3100 may perform a data write operation, a data read operation or a data erase operation under the control of the controller 2300. Although not illustrated in the drawing, the memory controller 2100 and the nonvolatile memory 3100 may include respective interfaces that are capable of performing communication with each other.

Figure 2:
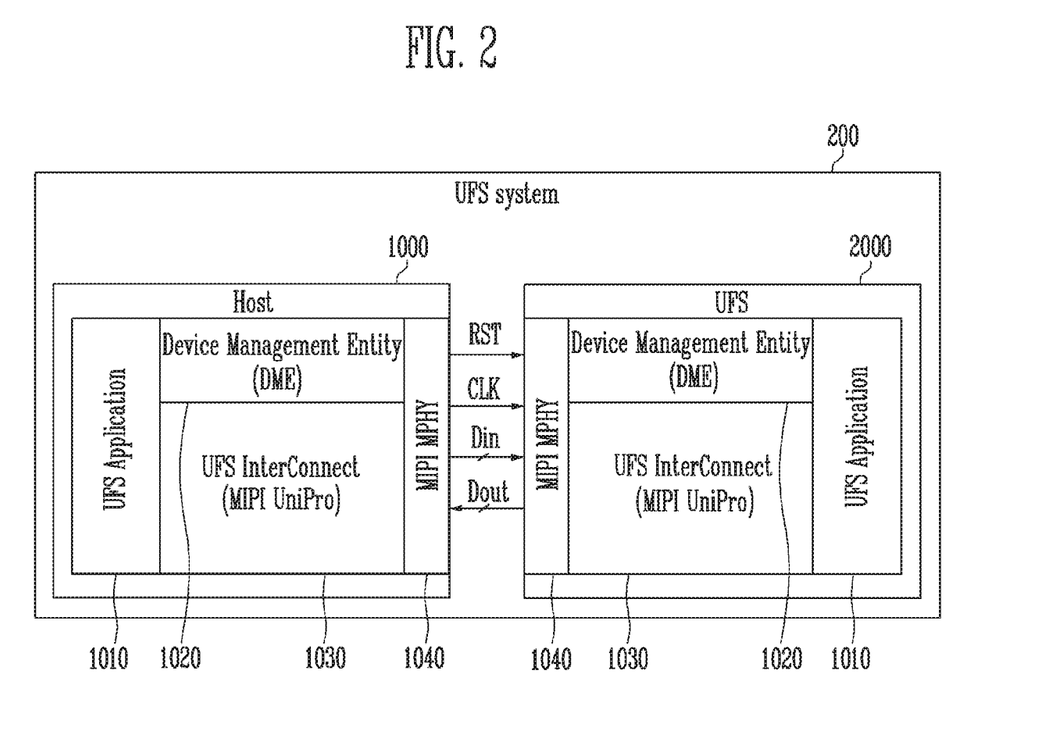
FIG. 2 is an example diagram illustrating a multi-layered hierarchical structure of the storage system of FIG. 1.

FIG. 2 is an example diagram illustrating a multi-layered hierarchical structure of the storage system of FIG. 1.

In FIG. 2, the hierarchical structure of a Universal Flash Storage (UFS) system is illustrated as an example. Hereinafter, in the description of embodiments of the present disclosure, the UFS system will be described as an example, but the embodiments of the present disclosure are not limited thereto, and may be applied to various storage systems having a multi-layered hierarchical structure. Individual layers illustrated in FIG. 2 may be implemented as hardware, firmware or software.

Referring to FIG. 2, a UFS system 200 may include a host 1000 and a UFS 2000.

The host 1000 may include a UFS application layer 1010, a Device Management Entity (DME) 1020, a UFS Inter-Connect (UIC) layer 1030, and a Mobile Industry Processor Interface (MIPI) physical (M-PHY or MPHY) layer 1040.

Similarly, the UFS 2000 may include a UFS application layer 1010, a Device Management Entity (DME) 1020, a UFS InterConnect (UIC) layer 1030, and a MIPI M-PHY layer 1040.

Hereinafter, for convenience of description, respective layers of the UFS 2000 will be described, and the layers of the host 1000 may perform operations identical or similar to those of respective layers of the UFS 2000.

The UFS application layer 1010 may run various types of firmware required in order to operate the UFS 2000. For example, the UFS application layer 1010 may include a UFS Command Set (UCS) layer, and the UCS layer may manage commands that are used by the UFS 2000 to read, write or erase data.

The Device Management Entity (DME) 1020 may control the UFS InterConnect (UIC) layer 1030.

The UFS interconnect layer 1030 may provide a service for the UFS application layer 1010 which is an upper layer. For example, the UFS interconnect layer 1030 may generate a UFS Protocol Information Unit (UPIU), which is a data packet for transmission/reception of data or requests, or may release a received UPIU. The UFS interconnect layer 1030 may correspond to a Unified Protocol (UniPro) among interface protocols proposed by the MIPI Alliance.

The MIPI M-PHY layer 1040 may convert information received from the UFS interconnect layer 1030, which is an upper layer, in conformity with a predefined protocol, and may transmit the converted information to the host 1000. Further, the MIPI M-PHY layer 1040 may convert information received from the host 1000 in conformity with a predefined protocol, and may transmit the converted information to the UFS interconnect layer 1030, which is the upper layer.

In an embodiment, the UFS application layer 1010 and the UFS interconnect layer 1030 may each be implemented in the form of firmware, and may be executed by the controller 2300, described above with reference to FIG. 1.

Figure 3:
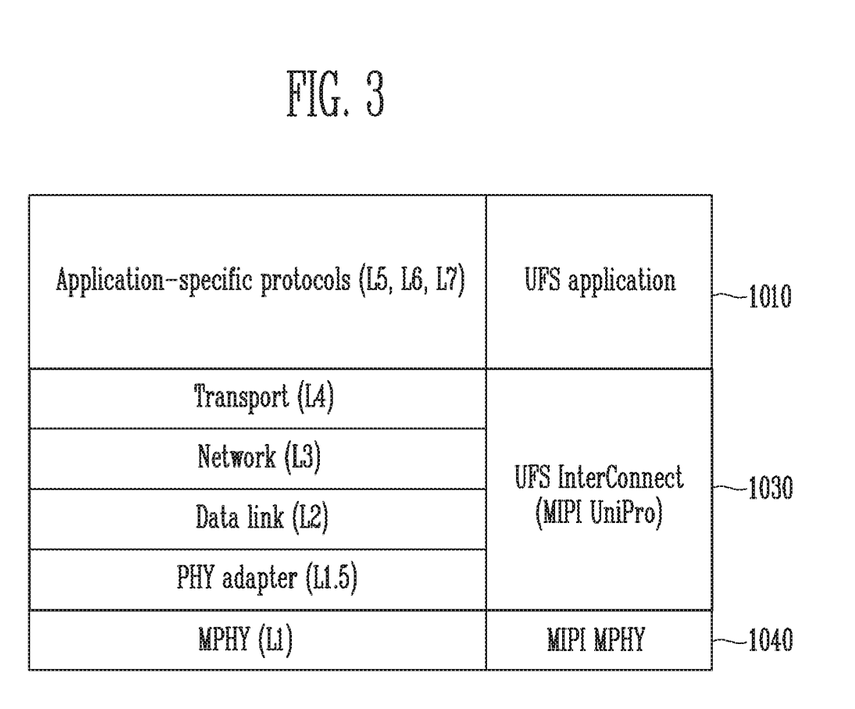
FIG. 3 is an example diagram illustrating in detail a hierarchical structure of a UFS system of FIG. 2.

FIG. 3 is an example diagram illustrating in detail a hierarchical structure of the UFS system of FIG. 2.

In FIG. 3, a case where the UFS interconnect layer 1030 is composed of four layers is illustrated as an example. Referring to FIG. 3, the UFS interconnect (MIPI UniPro) layer 1030 may include a PHY adapter layer L1.5, a data link layer L2, a network layer L3, and a transport layer L4.

The PHY adapter layer L1.5 couples an M-PHY layer L1 to the data link layer L2. The M-PHY layer L1 may correspond to the layer L1 of an Open Systems Interconnection (OSI) reference model, and the data link layer L2 may correspond to the layer L2 of the OSI reference model. Therefore, the PHY adapter layer L1.5 may be referred to as a "layer L1.5". The PHY adapter layer L1.5 may perform bandwidth control, power management, etc. between the M-PHY layer L1 and the data link layer L2.

The data link layer L2 may perform flow control for data transfer between the host and the UFS. That is, the data link layer L2 may monitor data transfer or control a data transfer rate. Further, the data link layer L2 may perform Cyclic Redundancy Check (CRC)-based error control. The data link layer L2 may generate a frame using a packet received from the network layer L3 or may generate a packet using a frame received from the PHY adapter layer L1.5.

The network layer L3 may perform a routing function for selecting a transmission path for packets received from the transport layer L4. The network layer L3 may correspond to the layer L3 of the OSI reference model.

The transport layer L4 may configure a packet suitable for a protocol using a command received from the UFS application layer 1010 and transmit the packet to the network layer L3, or may extract a command from a packet received from the network layer L3 and transmit the command to the UFS application layer 1010. The transport layer L4 may use a sequence-based error control scheme so as to guarantee the effectiveness of data transmission. The transport layer L4 may correspond to the layer L4 of the OSI reference model.

Figure 4:
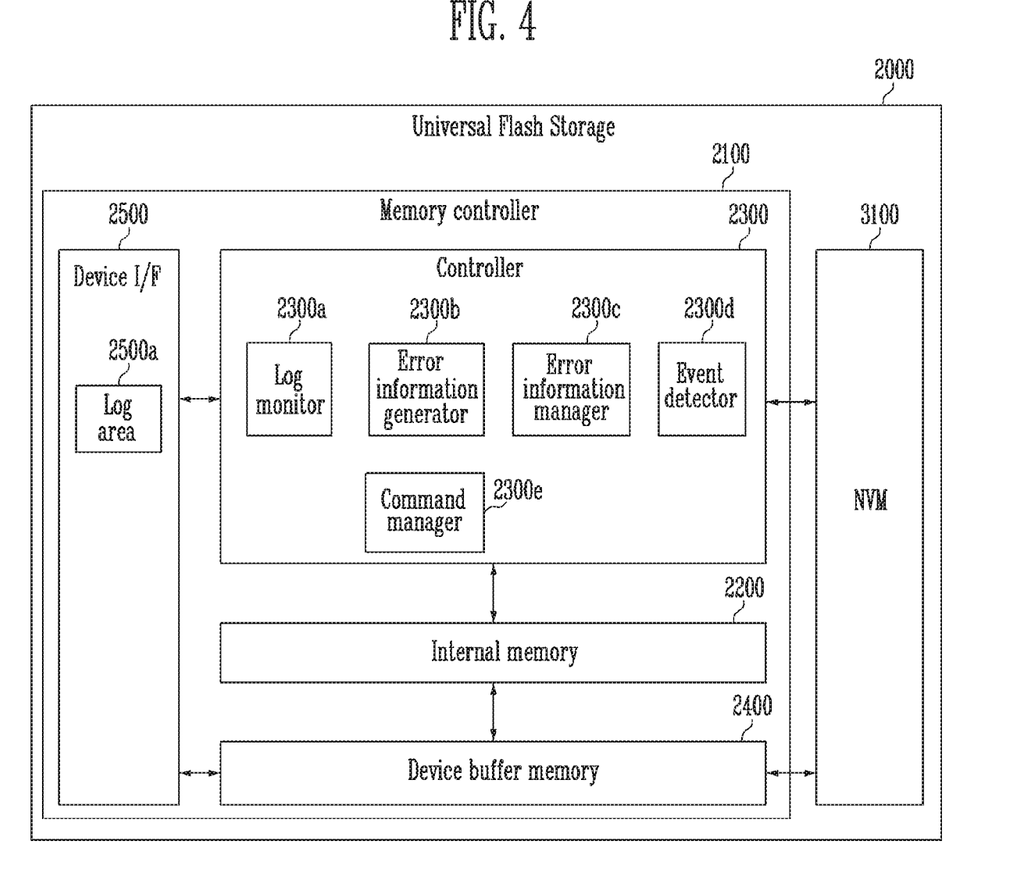
FIG. 4 is an example diagram illustrating a storage device of FIG. 1.

FIG. 4 is an example diagram illustrating the storage device of FIG. 1.

An embodiment described with reference to FIG. 4 will be made for a storage device which is a UFS 2000. However, embodiments of the present disclosure are not limited to the UFS 2000, but may be applied to various storage systems having a multi-layered hierarchical structure.

Referring to FIG. 4, the UFS 2000 may include a memory controller 2100 and a nonvolatile memory (NVM) 3100.

The memory controller 2100 may control the overall operation of the UFS 2000.

The memory controller 2100 may include an internal memory 2200, a controller 2300, a device buffer memory 2400, and a device interface (Device I/F) 2500.

The internal memory 2200 may store various types of information generated while the memory controller 2100 or the controller 2300 is operating.

The controller 2300 may control the overall operation of the UFS 2000. For example, the controller 2300 may control a write operation, a read operation or an erase operation of the nonvolatile memory 3100. The controller 2300 may exchange data with the nonvolatile memory 3100 or the device buffer memory 2400 through an address bus or a data bus.

When an error occurs while a command is being processed in the device interface 2500, the controller 2300 may manage information about the occurring error. For example, the command may include at least one of a UFS InterConnect (UIC) command or a Small Computer System Interface (SCSI) command.

The controller 2300 may include a log monitor 2300*a*, an error information generator 2300*b*, an error information manager 2300*c*, an event detector 2300*d*, and a command manager 2300*e*.

The log monitor 2300*a* may monitor an error occurring in the device interface 2500. For example, in a log area 2500*a* of the device interface 2500, error information that is information about an error, occurring while a command is being processed, may be recorded. Therefore, the log monitor 2300*a* may determine whether an error has occurred while the command is being processed in the device interface 2500 by monitoring the log area 2500*a*. When an error occurs while the command is being processed in the device interface 2500, that is, when error information is recorded in the log area 2500*a*, the log monitor 2300*a* may receive the error information from the device interface 2500. That is, the log monitor 2300*a* may monitor the log area 2500*a*, and may receive new error information from the device interface 2500 when the new error information is recorded in the log area 2500*a*.

In accordance with an embodiment, the log monitor 2300*a* may be omitted and, in this case, the device interface 2500 may provide new error information to the error information generator 2300*b* whenever the new error information is recorded in the log area 2500*a*.

The error information may include the types of commands for which errors have occurred. The error information may include the types of errors occurring while commands are being processed in various protocol layers. For example, the error information may include the types of errors occurring while each command is being processed at at least one of a plurality of layers belonging to the UFS interconnect (UIC) layer.

The error information generator 2300b may receive pieces of error information from the log monitor 2300a or the device interface 2500. The error information generator 2300b may generate command error information corresponding to the commands for which errors have occurred, by collecting the pieces of error information received, and may store the generated command error information in the internal memory 2200. The command error information may include the types of commands for which errors have occurred and the types of errors occurring for respective commands. For example, the command error information may include the types of errors occurring while each command is being processed at at least one of the plurality of layers belonging to the UFS interconnect layer.

The command error information may be generated in the format of a bit sequence. For example, some bits of the command error information may indicate the type of a command for which an error has occurred, and some other bits of the command error information may indicate the type of error occurring while the corresponding command is being processed. That is, respective bits included in the bit sequence-format command error information may indicate the types of commands for which errors have occurred, or the types of errors occurring while each command is being processed. For example, when an error occurs for a specific command, a bit corresponding to the command for which the error has occurred, among bits capable of indicating the types of commands, may be set to '1', and the remaining bits, among the bits capable of indicating the types of commands, may be set to '0'. Similarly, when an error occurs for a specific command, a bit corresponding to the type of the occurring error, among bits capable of indicating the types of errors, may be set to '1', and the remaining bits, among the bits capable of indicating the types of errors, may be set to '0'. Therefore, transmission/reception elements which share items, indicated by respective bits included in the bit sequence-format command error information, with each other may determine the types of commands for which errors have occurred and the types of errors occurring while the corresponding command is being processed, based on the bit sequence-format command error information.

When a set event occurs, the error information manager 2300c may store the command error information, stored in the internal memory 2200, in the nonvolatile memory 3100. For example, when notification that a set event has occurred is received from the event detector 2300d, the error information manager 2300c may store the command error information, stored in the internal memory 2200, in the nonvolatile memory 3100. In an embodiment, when the command error information is stored in the nonvolatile memory 3100, the error information manager 2300c may store a SCSI command history, stored in the internal memory 2200, together with the command error information, in the nonvolatile memory 3100. The SCSI command history may include information about a set number of SCSI commands that are most recently received or transmitted. In an embodiment, the error information manager 2300c may store information about SCSI commands received or transmitted before the command for which the error has occurred is processed, together with the command error information. The SCSI command information may include the types of SCSI commands.

The event detector 2300d may detect whether a set event has occurred, and may notify the error information manager 2300c of the occurrence of the set event when the set event is detected. For example, when it is determined to perform at least one of entry into a hibernation mode, firmware reload, or system reset, the event detector 2300d may notify the error information manager 2300c that the set event has occurred.

In an embodiment, the event detector 2300d may detect whether a command for instructing entry into the hibernation mode has been received, and may notify the error information manager 2300c that the set event has occurred when the command for instructing entry into the hibernation mode is received. Whether the command for instructing entry into the hibernation mode has been received may be checked by monitoring commands that are transmitted from the device interface 2500 and are received by the controller 2300.

In an embodiment, firmware or pieces of data required for configuration of the firmware may be stored in the nonvolatile memory 3100. The controller 2300 may control the overall operation of the UFS 2000 by loading the firmware or pieces of data required for configuration of the firmware, stored in the nonvolatile memory 3100, into the internal memory 2200 and by running the firmware on the internal memory 2200. When an available space of the internal memory 2200 is insufficient due to entry into the hibernation mode, the controller 2300 may determine to reload the firmware. When it is determined to reload the firmware, the controller 2300 may unload the firmware running on the internal memory 2200, and may reload the firmware or pieces of data required for configuration of the firmware from the nonvolatile memory 3100 when exiting the hibernation mode. When the controller 2300 determines to reload the firmware, the event detector 2300d may notify the error information manager 2300c that the reload of the firmware has been determined.

In an embodiment, when it is determined that a problem has occurred in the operation of the UFS 2000, the host (e.g., 1000 of FIG. 1) may transmit a command for instructing system reset to the UFS 2000. The event detector 2300d may monitor the commands that are transmitted from the device interface 2500 and are received by the controller 2300, and may notify the error information manager 2300c of the reception of the command for instructing system reset when the system reset command is received.

The command manager 2300e may store (or queue), in the internal memory 2200, information about an SCSI command received from the host or information about an SCSI command to be transmitted to the host. The command manager 2300e may store a set number of SCSI commands that are most recently received or transmitted in the internal memory 2200.

The device buffer memory 2400 may temporarily store data to be stored in the nonvolatile memory 3100 or data read from the nonvolatile memory 3100. The device buffer memory 2400 may be implemented as a volatile memory or a nonvolatile memory.

The device interface 2500 may process each command, and may record error information in the log area 2500a when an error occurs while the command is being processed. The error information may be stored in bitmap format.

When a request from the log monitor 2300a is received, the device interface 2500 may provide the error information, recorded in the log area 2500a, to the log monitor 2300a or to the error information generator 2300b.

In accordance with an embodiment, whenever a new error occurs during the processing of commands, the device interface 2500 may provide error information about the occurring error to the error information generator 2300b.

The device interface 2500 may communicate with the host interface 1500 using at least one of interface protocols such as Peripheral Component Interconnect-Express (PCIe), Advanced Technology Attachment (ATA), Serial ATA (SATA), Parallel ATA (PATA), Universal Serial Bus (USB), Multi-Media Card (MMC), Enhanced Small Disk Interface (ESDI), Integrated Drive Electronics (IDE), Mobile Industry Processor Interface (MIPI), Universal Flash Storage (UFS), Small Computer System Interface (SCSI), or Serial Attached SCSI (SAS), but the embodiments of the present disclosure are not limited thereto.

The nonvolatile memory 3100 may perform a data write operation, a data read operation or a data erase operation under the control of the controller 2300. Although not illustrated in the drawing, the memory controller 2100 and the nonvolatile memory 3100 may include respective interfaces that are capable of performing communication with each other.

Figure 5:
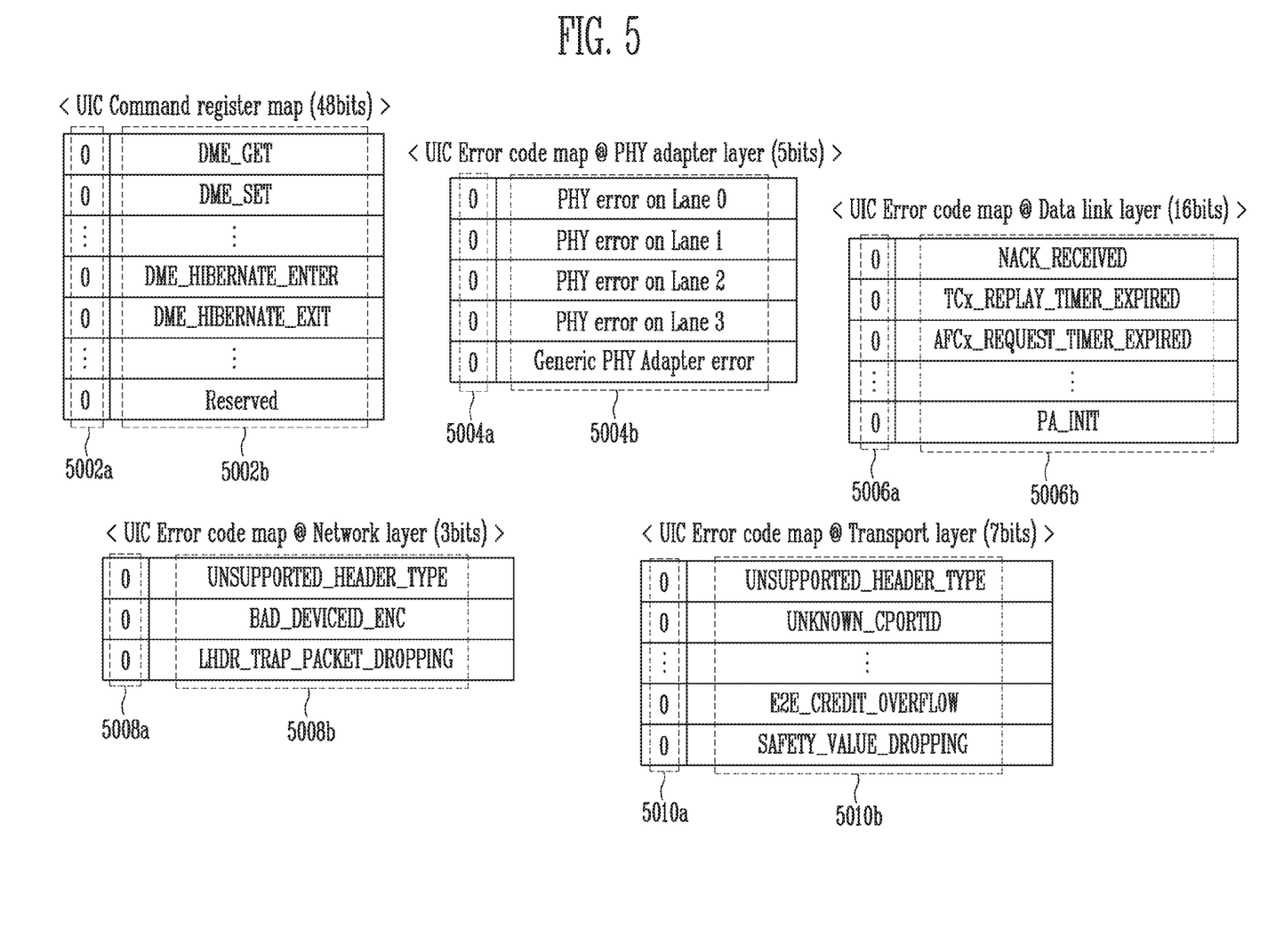
FIG. 5 is an example diagram describing the types of UIC commands and the types of errors.

FIG. 5 is an example diagram describing the types of UIC commands and the types of errors.

In FIG. 5, an example in which the types of UIC commands and the types of errors are managed in bitmap format is illustrated by way of example. The bitmap format error information illustrated in FIG. 5 may be stored in a log area of a device interface. The bitmap format error information illustrated in FIG. 5 may be equally reflected in an internal memory.

In FIG. 5, the type of a UIC command is managed as 48 bits and in which the type of error at a PHY adapter layer is managed as 5 bits, the type of error at a data link layer is managed as 16 bits, the type of error at a network layer is managed as 3 bits, and the type of error at a transport layer is managed as 7 bits is illustrated by way of example.

Bits 5002a of a UIC command register map may indicate whether errors have occurred for UIC commands 5002b corresponding to respective bits. For example, a case where a bit corresponding to a DME_GET command is set to '1' may indicate that an error has occurred while the DME_GET command is being processed.

Bits 5004a of a UIC error code map at the PHY adapter layer (i.e., UIC Error code map @ PHY adapter layer) may indicate error types 5004b corresponding to respective bits. For example, a case where a bit corresponding to 'PHY error on Lane 0' is set to '1' may indicate that an error has occurred in lane 0 while a UIC command is being processed.

Bits 5006a of a UIC error code map at the data link layer (UIC Error code map @ Data link layer) may indicate error types 5006b corresponding to respective bits. For example, a case where a bit corresponding to NACK_RECEIVED is set to '1' may indicate that a Negative ACKnowledgement (HACK) has been received while a UIC command is being processed.

Bits 5008a of a UIC error code map at the network layer (UIC Error code map @ Network layer) may indicate error types 5008b corresponding to respective bits. For example, a case where a bit corresponding to BAD_DEVICEID_ENC is set to '1' may indicate that an error is present in a device identifier.

Bits 5010a of a UIC error code map at the transport layer (UIC Error code map @ Transport layer) may indicate error types 5010b corresponding to respective bits. For example, a case where a bit corresponding to UNSUPPORTED_HEADER_TYPE is set to '1' may indicate that an error is present in a header of a packet.

In the log area of the device interface or in the internal memory, only the bits 5002a, 5004a, 5006a, 5008a, and 5010a may be stored, and regions 5002b, 5004b, 5006b, 5008b, and 5010b may not be stored. For this operation, the device interface or the device controller may contain bitmap information representing meanings indicated by respective bits.

Figure 6:
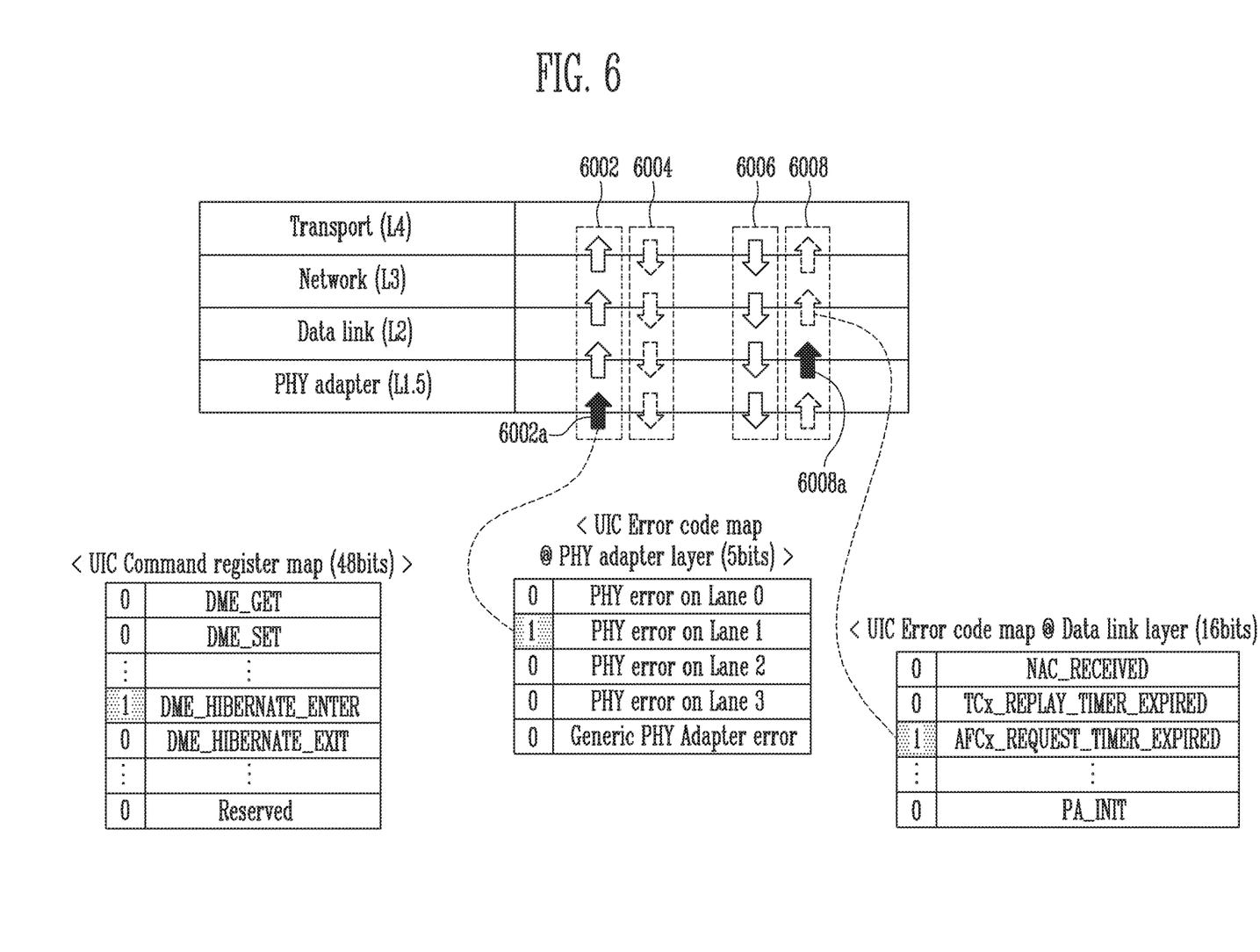
FIG. 6 is an example diagram illustrating a case where an error occurs while a UIC command is being processed.

FIG. 6 is an example diagram illustrating a case where an error occurs while a UIC command is being processed.

For convenience of description, only four layers corresponding to a UIC layer (i.e., a PHY adapter layer L1.5, a data link layer L2, a network layer L3, and a transport layer L4) are illustrated in FIG. 6.

An arrow group 6002 denotes a flow in which a UIC command received from a host is transmitted. For example, when a UIC command DME_HIBERNATE_ENTER for instructing entry into a hibernation mode is received from the host, the UIC command may be sequentially transmitted to the PHY adapter layer L1.5, the data link layer L2, the network layer L3, and the transport layer L4.

An arrow group 6004 denotes a flow in which each layer transmits an ACKnowledgement (ACK) signal, indicating that the UIC command has been normally received, to a lower layer thereof. For example, the data link layer L2 may be configured to, when a UIC command is received from the PHY adapter layer L1.5, which is a lower layer thereof, transmit an ACK signal, indicating that the corresponding UIC command has been normally received, to the PHY adapter layer L1.5.

An arrow group 6006 denotes a flow in which each layer transmits a response corresponding to the result of processing the UIC command to a lower layer thereof. For example, the transport layer L4 may process a UIC command received from the network layer L3, which is a lower layer thereof, and may transmit a response corresponding to the result of processing the UIC command to the network layer L3.

An arrow group 6008 denotes a flow in which each layer transmits an ACK signal, indicating that the response corresponding to the result of processing the UIC command has been normally received, to an upper layer thereof. For example, the data link layer L2 may be configured to, when the response corresponding to the result of processing the UIC command is received from the network layer L3, which is an upper layer thereof, transmit an ACK signal, indicating that the corresponding response has been normally received, to the network layer L3.

Each layer belonging to the UIC layer may record error information in the log area when an error is reported from an adjacent layer (e.g., an upper layer or a lower layer), when a response corresponding to the result of processing a UIC command is not received, or when an ACK signal is not received.

For example, when the PHY adapter layer L1.5 receives a report that an error has occurred in lane 1 from a MIPI M-PHY layer (see 1040 of FIG. 2), which is a lower layer (the case of 6002a), the PHY adapter layer L1.5 may record error information, indicating that the error has occurred in lane 1, in the log area. As described above, the error information may be managed in bitmap format, and the bitmap may be updated so as to indicate that the error has occurred in lane 1. When '0' indicates a case where no error has occurred and '1' indicates a case where an error has occurred, it can be seen in FIG. 6 that information indicating that the error has occurred in lane 1 is recorded in the UIC error code map corresponding to the PHY adapter layer.

For example, when the data link layer L2 has transmitted a response corresponding to the result of processing the UIC command to the PHY adapter layer L1.5, which is a lower layer, and thereafter does not receive an ACK signal indicating that the corresponding response has been normally received (the case of 6008a), the data link layer L2 may record error information AFCx_REQUEST_TIMER_EXPIRED, indicating that a timer for ACK reception has expired, in the log area. That is, after transmitting a UIC command to an adjacent layer or transmitting a response corresponding to the result of processing the UIC command to the adjacent layer, each layer may execute the timer for ACK reception, and may record error information in the log area when an ACK signal is not received before the corresponding timer expires.

Meanwhile, when an error occurs at at least one layer belonging to the UIC layer while the UIC command is being processed, the device interface 2500 may set a flag for the corresponding UIC command. Referring to the UIC command register map of FIG. 6, it can be seen that an error has occurred while a UIC command DME_HIBERNATE_ENTER for instructing entry into a hibernation mode is being processed.

Figure 7:
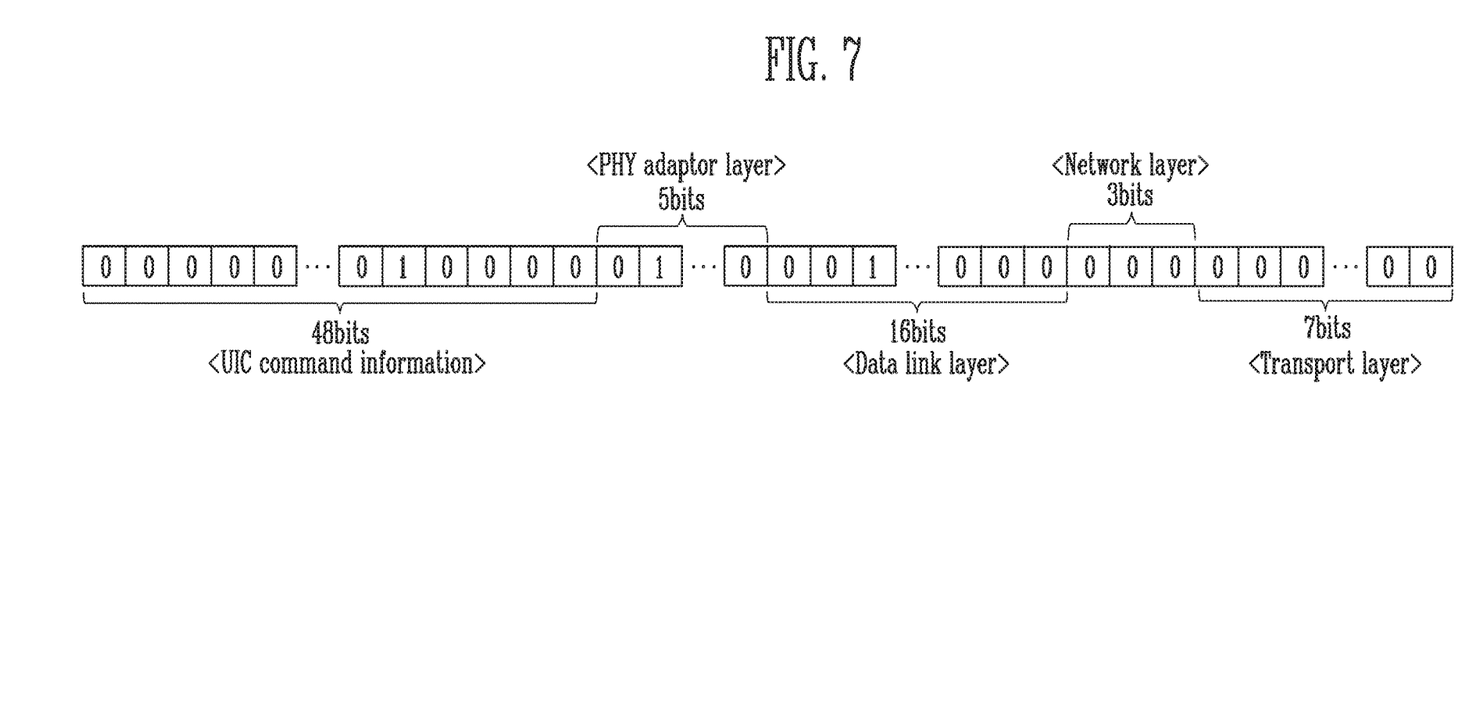
FIG. 7 is a diagram illustrating an example in which command error information is transmitted.

FIG. 7 is a diagram illustrating an example in which command error information is transmitted.

In FIG. 7, an example is illustrated in which 48 bits are assigned to UIC command information, 5 bits are assigned to the error type of a PHY adapter layer, 16 bits are assigned to the error type of a data link layer, 3 bits are assigned to the error type of a network layer, and 7 bits are assigned to the error type of a transport layer.

As illustrated in FIG. 7, the device controller may generate command error information in the format of a bit sequence, store the bit sequence-format command error information in an internal memory, and dump the stored bit sequence-format command error information into a nonvolatile memory.

Figure 8:
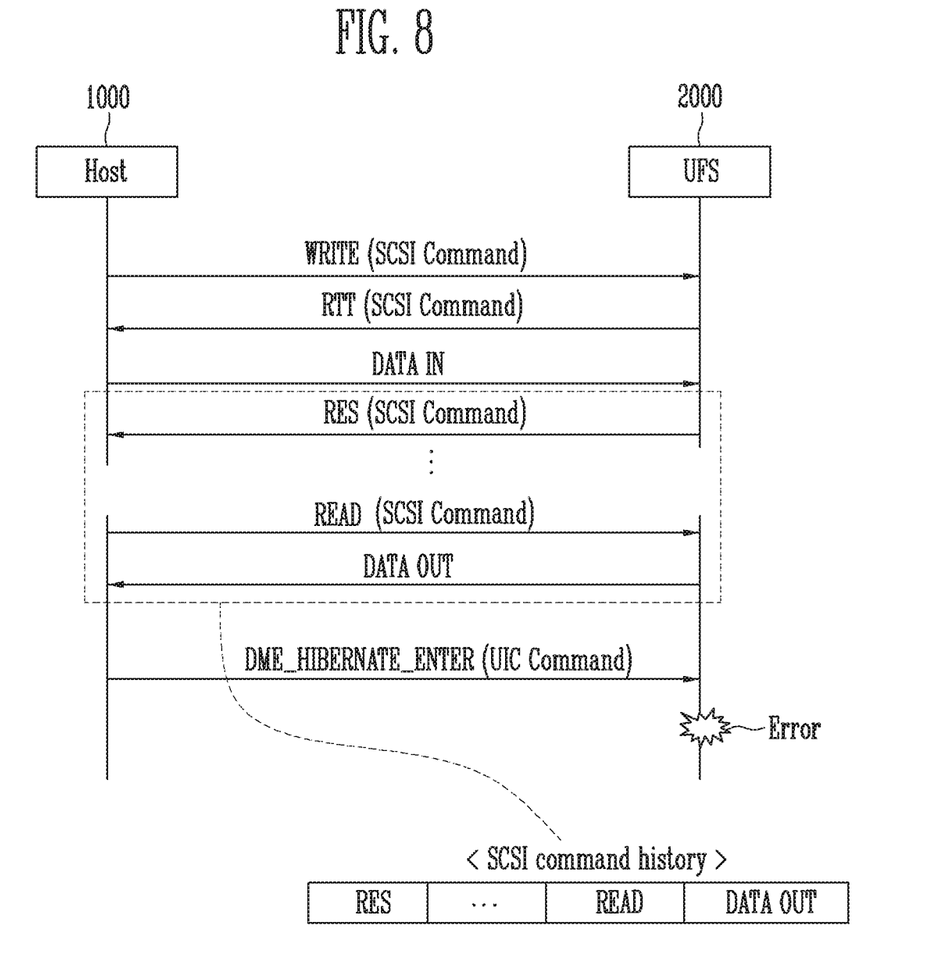
FIG. 8 is a diagram illustrating an example in which SCSI commands are stored.

FIG. 8 is a diagram illustrating an example in which SCSI commands are stored.

In FIG. 8, an example in which some of SCSI commands transmitted or received before a UIC command is processed are stored as a SCSI command history is illustrated by way of example.

Referring to FIG. 8, an example is illustrated in which a UFS 2000 transmits a Ready To Transfer (RTT) signal to a host 1000 in response to a write request WRITE from the host 1000 and in which the UFS 2000 writes data depending on data input DATA IN received from the host 1000 and thereafter transmits a response signal RES to the host 1000.

Further, an example is illustrated in which the UFS 2000 outputs data DATA OUT to the host 1000 in response to a read request READ from the host 1000.

Thereafter, a case where an error occurs while the UFS 2000, having received a UIC command DME_HIBERNATE_ENTER for instructing entry into a hibernation mode from the host 1000, is processing the UIC command, is illustrated.

The UFS 2000 may store (or queue) a set number of SCSI commands received from the host 1000 or SCSI commands to be transmitted to the host 1000. Also, when an error occurs while the UIC command is being processed, the UFS 2000 may store information about a set number of SCSI commands among SCSI commands transmitted and/or received before the corresponding UIC command is processed, together with pieces of error information for respective UIC commands, in a nonvolatile memory area. The stored information may be used to reproduce an error condition when error analysis is subsequently performed.

Figure 9:
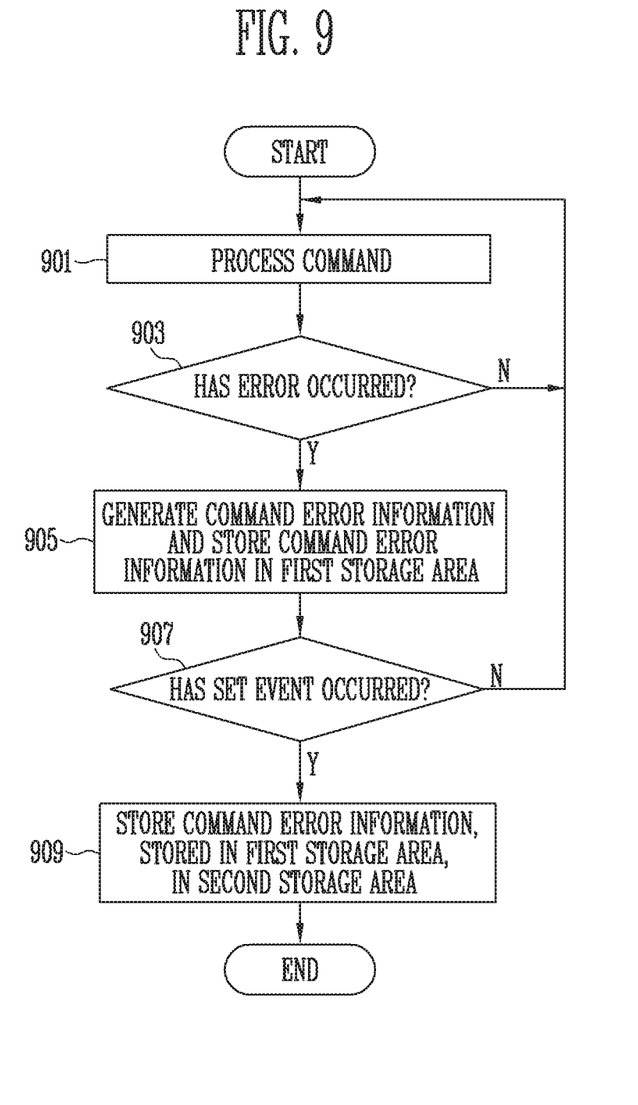
FIG. 9 is an example diagram illustrating a method of operating a storage device in accordance with an embodiment of the present disclosure.

FIG. 9 is an example diagram illustrating a method of operating a storage device in accordance with an embodiment of the present disclosure.

At step 901, the storage device may process a command. The command may be a UIC command. For example, each of a plurality of layers belonging to a UIC layer may process a command received from a host or a command to be provided to the host.

At step 903, the storage device may determine whether an error has occurred while the command is being processed. For example, when an error is reported from an adjacent layer or when neither a response nor an ACK is received from the adjacent layer, each of the plurality of layers belonging to the UIC layer may determine that an error has occurred. When it is determined that no error has occurred while the command is being processed (in case of N), step 901 of processing a command received from the host or a command to be transmitted to the host may be performed again. When it is determined that an error has occurred while the command is being processed (in case of Y), step 905 may be performed.

At step 905, the storage device may generate command error information, and may store the command error information in a first storage area. The command error information may be stored in the format of a bit sequence. The first storage area may be a volatile storage area.

At step 907, the storage device may detect whether a set event has occurred. For example, the storage device may detect whether performance of at least one of entry into a hibernation mode, firmware reload, or system reset has been determined. When a set event has not occurred (in case of N), step 901 of processing a command received from the host or a command to be transmitted to the host may be performed again. When the set event has occurred (in case of Y), step 909 may be performed.

At step 909, the UFS may store the command error information, stored in the first storage area, in a second storage area. The second storage area may be a nonvolatile storage area.

Figure 10:
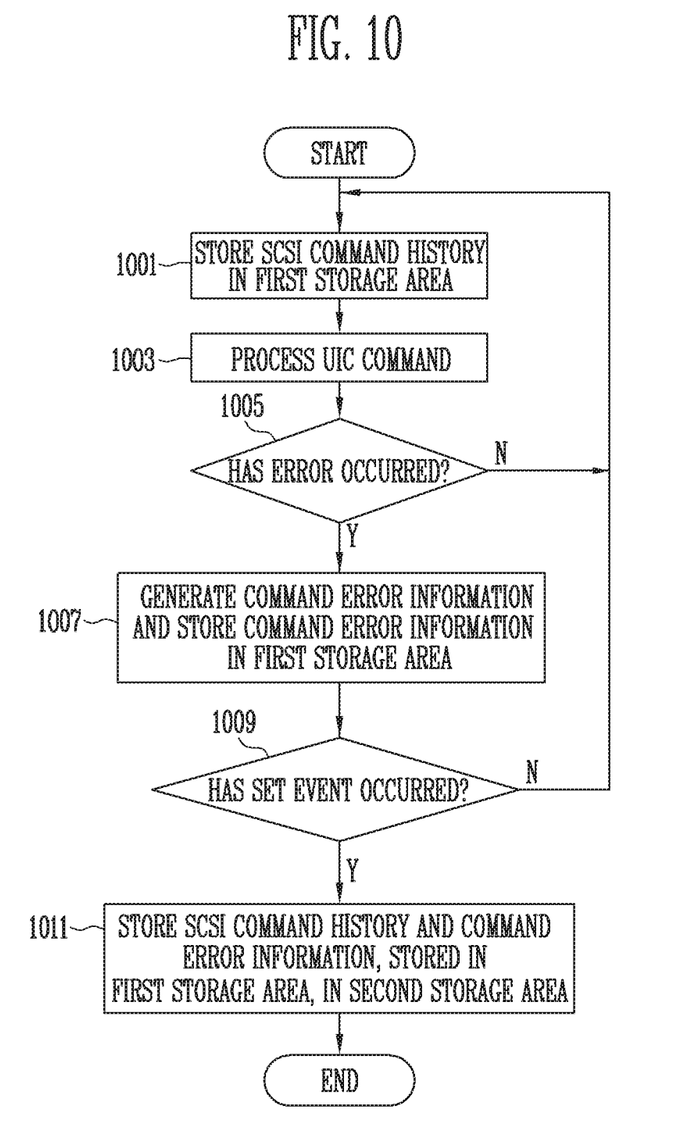
FIG. 10 is an example diagram illustrating a method of operating a storage device in accordance with an embodiment of the present disclosure.

FIG. 10 is an example diagram illustrating a method of operating a storage device in accordance with an embodiment of the present disclosure.

At step 1001, the storage device may store a SCSI command history in a first storage area. For example, the storage device may process an SCSI command received from the host or an SCSI command to be transmitted to the host. The storage device may store (or queue) a set number of SCSI commands that are processed, in the first storage area.

At step 1003, the storage device may process a UIC command. For example, each of a plurality of layers belonging to a UIC layer may process a UIC command received from the host or a UIC command to be provided to the host.

At step 1005, the storage device may determine whether an error has occurred while the UIC command is being processed. For example, when an error is reported from an adjacent layer or when neither a response nor an ACK is received from the adjacent layer, each of the plurality of layers belonging to the UIC layer may determine that an error has occurred. When it is determined that no error has occurred while the UIC command is being processed (in case of N), the storage device may again perform step 1001 of storing the SCSI command history in the first storage area. When it is determined that an error has occurred while the UIC command is being processed (in case of Y), step 1007 may be performed.

At step 1007, the storage device may generate command error information, and may store the command error information in the first storage area. The command error information may be stored in the format of a bit sequence. The first storage area may be a volatile storage area.

At step 1009, the storage device may detect whether a set event has occurred. For example, the storage device may detect whether performance of at least one of entry into a hibernation mode, firmware reload, or system reset has been determined. When a set event has not occurred (in case of N), the storage device may again perform step 1001 of storing a SCSI command history in the first storage area. When the set event has occurred (in case of Y), step 1011 may be performed.

At step 1011, the storage device may store the SCSI command history and command error information, stored in the first storage area, in a second storage area. The storage device may store information about SCSI commands received or transmitted before the UIC command, for which the error has occurred, is processed, together with the command error information, in the second storage area. The second storage area may be a nonvolatile storage area.

In accordance with the present disclosure, error information occurring in the storage device may be effectively managed, and the cause of error may be promptly investigated based on the managed error information.

While the exemplary embodiments of the present disclosure have been disclosed for illustrative purposes, those skilled in the art will appreciate that various modifications, additions and substitutions are possible. Therefore, the scope of the present disclosure must be defined by the appended claims and equivalents of the claims rather than by the description preceding them.

What is claimed is:

1. A controller for a storage device, comprising:
   an error information generator configured to receive error information about an error occurring while a command is being processed at a protocol layer, generate command error information corresponding to the command based on the received error information, and store the generated command error information in a first storage area; and
   an error information manager configured to move the command error information stored in the first storage area to a second storage area in response to an external request from a host.

2. The controller according to claim 1, further comprising a log monitor configured to monitor the protocol layer and to request transmission of the error information when the error information is recorded in the protocol layer.

3. The controller according to claim 1, wherein the error information generator is configured to generate the command error information in a bit sequence format.

4. The controller according to claim 1, wherein the protocol layer is a Universal Flash Storage InterConnect (UIC) layer.

5. The controller according to claim 4, wherein at least one of the error information or the command error information includes at least one of a type of a command for which the error has occurred, or a type of an error occurring while the command is being processed at at least one of a plurality of layers in the UIC layer.

6. The controller according to claim 4, wherein the UIC layer comprises at least one of a physical adapter layer, a data link layer, a network layer, or a transport layer.

7. The controller according to claim 1, further comprising an event detector configured to provide the error information manager with the external request when performance of at least one of entry into a hibernation mode, firmware reload, or system reset is determined.

8. The controller according to claim 1, further comprising a command manager configured to store information about Small Computer System Interface (SCSI) commands in the first storage area.

9. The controller according to claim 8, wherein the error information manager is configured to store information about an SCSI command transmitted or received before the command for which the error has occurred is processed, together with the command error information, in the second storage area.

10. The controller according to claim 1, wherein:
    the first storage area includes a volatile storage area, and
    the second storage area includes a nonvolatile storage area.

11. A storage device, comprising:
    a memory controller for the storage device, including a first storage area; and
    a memory device including a second storage area,
    wherein the memory controller is configured to, when an error occurs while a command is being processed at a protocol layer:
    generate command error information corresponding to the command;
    store the generated command error information in the first storage area; and
    move the command error information, stored in the first storage area, to the second storage area in response to a set event.

12. The storage device according to claim 11, wherein the memory controller is configured to generate the command error information in a bit sequence format.

13. The storage device according to claim 11, wherein the protocol layer is a Universal Flash Storage InterConnect (UIC) layer.

14. The storage device according to claim 13, wherein the command error information includes at least one of a type of a command for which the error has occurred, or a type of an error occurring while the command is being processed at at least one of a plurality of layers in the UIC layer.

15. The storage device according to claim 13, wherein the UIC layer comprises at least one of a physical adapter layer, a data link layer, a network layer, or a transport layer.

16. The storage device according to claim 11, wherein the set event corresponds to at least one of entry into a hibernation mode, firmware reload, or system reset.

17. The storage device according to claim 11, wherein the memory controller is configured to store information about Small Computer System Interface (SCSI) commands in the first storage area.

18. The storage device according to claim 17, wherein the memory controller is configured to store information about an SCSI command transmitted or received before the command for which the error has occurred is processed, together with the command error information, in the second storage area.

19. The storage device according to claim 11, wherein:
    the first storage area includes a volatile storage area, and
    the second storage area includes a nonvolatile storage area.

20. An operating method for a controller which controls a memory device in response to a Universal Flash Storage (UFS) command provided from a host communicating with the controller through a UFS protocol layer having plural layers, the operating method comprising:

detecting an error among the plural layers while executing the UFS command;
identifying a layer, in which the error occurs among the plural layers; and
controlling, when the controller becomes fully inactive, the memory device to store therein UFS information about the UFS command, the identified layer, and the error together with Small Computer System Interface (SCSI) information about one or more recent SCSI commands executed before the UFS command,
wherein the stored UFS information and SCSI information are provided for analyzing the error.

* * * * *